June 17, 1930.　　　C. KITTILSEN　　　1,764,961
PLANET GEARING
Filed March 28, 1929　　　6 Sheets-Sheet 1

Inventor:
Coom Kittilsen
by [signature] Atty.

June 17, 1930.  C. KITTILSEN  1,764,961
PLANET GEARING
Filed March 28, 1929  6 Sheets-Sheet 5

Inventor:
Coom Kittilsen,
by
Atty.

June 17, 1930.  C. KITTILSEN  1,764,961
PLANET GEARING
Filed March 28, 1929   6 Sheets-Sheet 6

Patented June 17, 1930

1,764,961

UNITED STATES PATENT OFFICE

COOM KITTILSEN, OF PORSGRUND, NORWAY

PLANET GEARING

Application filed March 28, 1929, Serial No. 350,697, and in Germany February 25, 1928.

I have filed an application in Germany Feb. 25, 1928.

The present invention relates to a planet gear particularly for power vehicles with a friction clutch which on the increase of load on the driven shaft permits the transmission ratio to be changed without it being necessary for this purpose to engage or disengage any toothed wheels with or from other toothed members. Such a gear does not only have the advantage that when in use the tedious engagement and disengagement of toothed wheels and the dangers connected therewith are eliminated, but the change of the transmission ratio is always effected so that a vehicle fitted with such a gear can accelerate or slow down without any shock. As compared with the gears of this type hitherto known the present invention has the important improvement that the gear, with the exception of changing into reverse or using the motor as a brake, operates entirely automatically, that is to say, without any actuation by the driver, that it is of comparatively small dimensions and does not possess any sensitive parts subjected to rapid wear, can easily be taken to pieces and again re-assembled, and that finally it simultaneously serves the purpose of the usual clutch so that this in general may be omitted.

The essential feature of the invention, by means of which all these advantages are obtained, resides in the fact that the two central wheels, of which one is rigidly connected to the driving shaft, are formed as the inner toothed members of two concentrically mounted drums with which gear planet wheels of different diameter mesh, the common carrier of these planet wheels being mounted on the driving shaft.

The invention will now be described with reference to the accompanying drawings in which are shown four examples of construction of the new gear, the first three examples being suitable for power vehicles, whilst the fourth is for application of the invention to a motor cycle.

Figures 5 to 9 illustrate a further form of construction of the automobile gear according to the invention, of which Figure 5 is a longitudinal section.

Figures 10 to 11 illustrate a gear suitable for motor cycles. Figure 10 is a longitudinal section and Figure 11 is a cross section on the line XI—XI of Figure 10.

The sections II—II, IV—IV and VIII—VIII are looking from left to right, the sections IX—IX and XI—XI are looking from right to left whilst the sections VI—VI and VII—VII show the same view looking in either direction.

In all the figures of the drawings the parts fulfilling the same purpose are indicated by the same references so as to facilitate the understanding of their operations.

Figure 1:
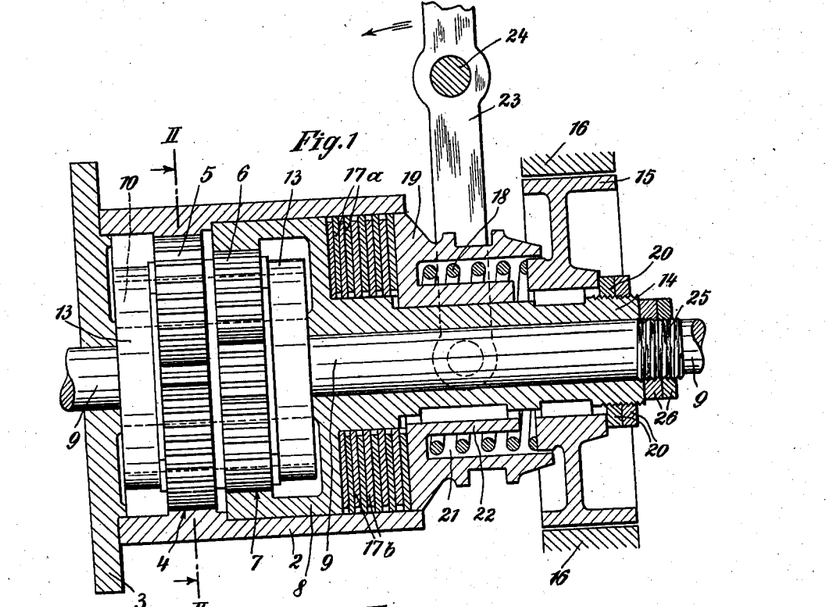
Figures 1 and 2 show the first form of construction of an automobile gear, Figure 1 being a longitudinal section and Figure 2 a cross section on the line II—II of Figure 1.
Figure 2:
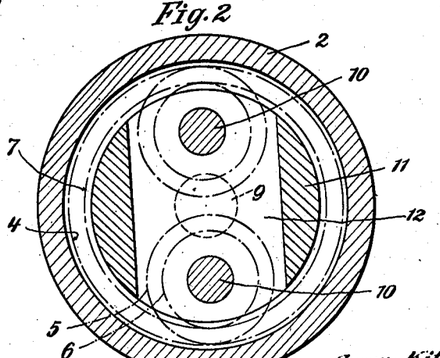

The drum 2 according to Figures 1 and 2, is for example connected to the engine shaft, not shown, by the clutch disc 3, the clutch disc 3 being preferably at the same time formed as the fly-wheel. The drum 2 is provided with internal teeth 4 with which planet wheels 5 mesh and wheels 5 are connected to smaller toothed wheels 6 all being mounted on shafts 10. The toothed wheels 6 gear with the internal teeth 7 of a second drum 8 which is freely rotatable on the shaft 9 connected to the driven wheels (not shown). The shaft 9 within the drums 2 and 8 is provided with an enlargement 11 provided, in the manner indicated in Figure 2, with a window like aperture 12. Within this aperture 12 are located the toothed wheels 5 and 6. Their shafts 10 are rotatably mounted, in the manner indicated in Figure 1, in the discs 13 of the shaft enlargement 12 which laterally limit the aperture 12.

The drum 8 is provided with a sleeve shaped extension 14 the end of which is engaged by two nuts 26 screwed on the screwed portion 25 of the shaft 9. The sleeve 14 is connected to a brake disc 15 which can be brought to rest by means of a band actuated by the foot or hand of the driver or by brake shoes 16.

The drum 2 is provided with a number of laminæ 17ª which co-operate with alternating and corresponding laminæ 17ᵇ mounted on the hub of the drum 8. The outermost lamina bears against a disc 19 of which the hub 22 is provided with an annular groove 21 accommodating a spring 18 of which the outer end bears against the hub of the brake disc 15 so that the laminæ 17ª and 17ᵇ are normally pressed against one another. The brake disc 15 is axially movable on the sleeve like extension 14 of the drum 8 by means of setting rings 20 screwed on to a screw threaded portion of the sleeve 14 so that the tension of the spring 18 and thus the pressure exerted on the laminæ 17ª, 17ᵇ can be suitably adjusted. The hub 22 of the disc 19 which receives in its annular groove 21 the spring 18 is in the known manner, and therefore only indicated diagrammatically, connected to a hand or foot lever 23 which when moved on its pivot 24 in the direction of the arrow moves the disc 19 against the pressure of the spring 18 away from the laminæ 17ª, 17ᵇ thus releasing the coupling between the two drums 2 and 8 acting as central wheels.

The operation of the gear is as follows:—

When starting the clutch 17ª, 17ᵇ is disengaged in the manner above described by means of the foot or hand lever 23 and the engine is started so that the fly-wheel or clutch disc 3 and the drum 2 connected thereto is set in rotation and the toothed wheels 5 and 6 rotate on their shafts 10 at a speed corresponding with the ratio of reduction between the drum 2 and the wheel 5.

As however, the shaft 9 with the two bearing discs 13 of the planet gear 5, 6 has a braking action applied thereto by the load of the vehicle these parts at first remain stationary so that the wheels 5 and 6 driven by the drum 2 rotate idly on their shafts 10. The small toothed wheel 6, therefore, also drives the drum 8, which also rotates idly about the stationary shaft 9, together with the sleeve 14 and the brake disc 15. As, however, the wheels 6 are at a higher ratio to the drum 8 than the wheels 5 to the drum 2, the drum 8 will rotate at a lower speed than the driving drum 2. If, however, the clutch 17ª 17ᵇ is firmly engaged by the action of the spring 18, the drum 8 will be directly driven by the drum 2 and at the same speed as this. The difference in the transmission ratio between the toothed members 5 and 4 on the one hand and the toothed members 7 and 6 on the other hand prevents the planet gear 5, 6, 10, 13, 9 from turning freely in the drums 2 and 8. This planet gear is therefore compelled to rotate with the drums and at the same speed as these thus forming a positive connection, that is to say a transmission of 1:1 between the parts 3, 2 and 9 or between the driving shaft and the driven shaft or the wheels of the vehicle of which the speed at this moment is the highest.

If for any reason, for example when reaching an upward inclination, the resistance to travelling is increased then the laminæ 17ª, 17ᵇ are caused to commence to slip relatively to one another by an amount corresponding to the increased requirement of power whereby the drum 8 lags with a corresponding slip behind the drum 2 and the speed of the planet gear 5, 6, 10, 13 with the shaft 9 is reduced as it begins to roll in the drums 2 and 3 and thus an increased torque is exerted on the vehicle wheels.

The tension of the spring 18 is so adjusted by means of the setting rings 20 that the clutch only begins to slip when the normal engine load is exceeded.

From the foregoing it will be seen that the speed of rotation of the driven shaft 9, which drives the wheels of the vehicles, is always suitably adjusted between zero and the speed of rotation of the engine whilst simultaneously varying in a suitable manner the torque exerted by the shaft 9 relatively to the amount of power required, and that this not only takes place constantly, but also entirely automatically.

For the purpose of obtaining reversal it is only necessary to disengage the clutch 17ª, 17ᵇ by means of the lever 23 and to apply a braking action to the drum 8, by means of the brake disc 15 and the brake band or shoes 16. The lever 23 may be so connected to the lever which effects the application of the shoes 16 that the disc 15 is braked simultaneously and positively when disengaging the clutch 17ª, 17ᵇ.

The drum 8 is thus caused to lag behind the drum 2 coupled with the engine to a greater extent than would correspond to the difference of their tooth transmission when running idly, so that the planet gears 5, 6, 10, 13, 9 are compelled to rotate in the opposite direction. The speed of this backward movement is naturally the higher the greater the braking action applied to the disc 15 and it reaches its maximum when the drum 8 is entirely stationary. In order to be able to effect the braking action 15 smoothly it may be connected to the drum 8 or to the sleeve 14 also by a laminæ clutch.

By a suitable selection of the transmission ratio between the parts 2, 5 on the one hand and the toothed members 6, 8 on the other hand it is possible even with a slight slipping of the laminæ 17ª, 17ᵇ or a slight relative difference in speed between the drums 2 and 8 to obtain a considerable variation in the speed of rotation of the planet gear 6, 10, 13, 9 so that the laminæ, which may consist alternately of steel and another metal and may operate in an oil bath, are only subjected to a slight amount of wear. In order to effect engagement and disengagement as smoothly as possible a very large number of laminæ is preferably employed. From the method of operation of this clutch 17ª, 17ᵇ it will be seen that it renders the usual clutch between the driving shaft and the gear unnecessary.

From the drawing and the specification it will be seen that the gear according to the present invention does not only permit of an entirely constant and automatic variation of the ratio of transmission between the driven shaft and the driving shafts within the limits of 1:1 to 1:00 but that by releasing the clutch 17ª, 17ᵇ which connects the two central wheels 2 and 8 and by braking or stopping the drum 8 it is also possible to produce rearward movement when the same transmission ratio is constantly and automatically set up and corresponds with the requirement of power at any time. By this simple change over to rearward movement it is possible to exert a very intensive yet non-deleterious braking action. Even though the teeth of the gear are to some extent made strong it is possible, in the case of immediate danger, by locking the drum 15 and disengaging the clutch 17 to allow the driven wheels of the vehicle to run backwardly without any undesirable strain being imposed upon the gear as would be the case with an ordinary change speed gear of which the toothed wheels would be certain to brake if an attempt were made to reverse their direction of rotation before they had come to rest. With a gear according to the present invention however, in which it is not necessary to bring any of the toothed wheels into or out of engagement, it is impossible for this to occur.

Any number of planet wheels 5, 6 may be arranged around the internal teeth 4 and 6 in accordance with the power to be transmitted. For light vehicles a single wheel 5, 6 is sufficient whereas for heavier loads three or more such wheels may be necessary.

Although it has been previously assumed that the drum 2 or the clutch disc 3 was connected to the driving shaft and the shaft 9 of the planet gear was connected to the driven shaft or with the wheels of the vehicle, the gear may be arranged in the reverse manner according to the present invention, that is to say the shaft 9 is connected to the engine and the drum 2 with the driven shaft. In this case a few slight constructional modifications, particularly in the selection of different transmission ratios may be preferable, but these will not modify the scope of the invention and for this reason will not be further described.

Figure 3:
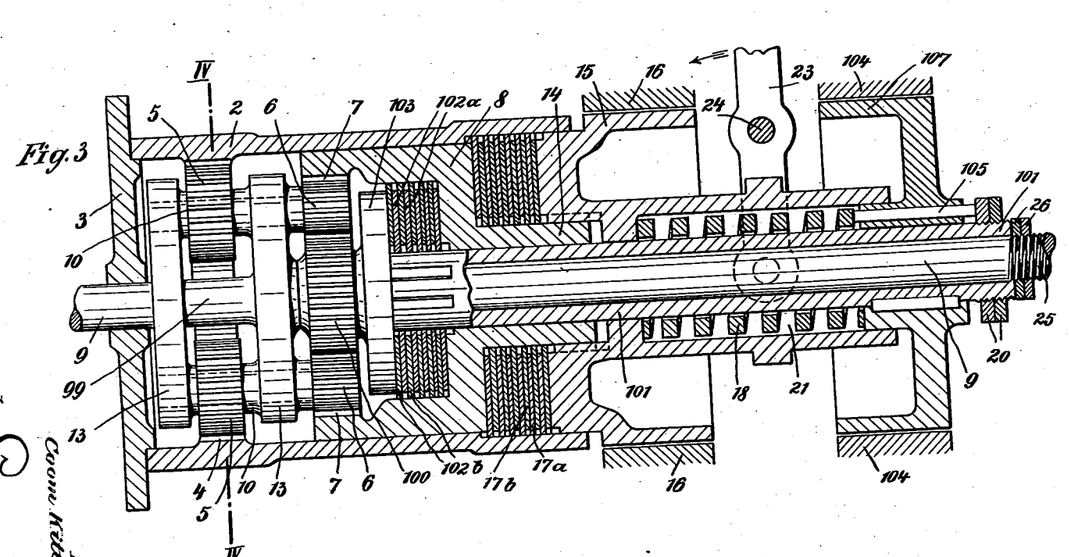
Figures 3 and 4 show another example of construction for an automobile gear, Figure 3 being a longitudinal section and Figure 4 a cross section on the line IV—IV of Figure 3.
Figure 4:
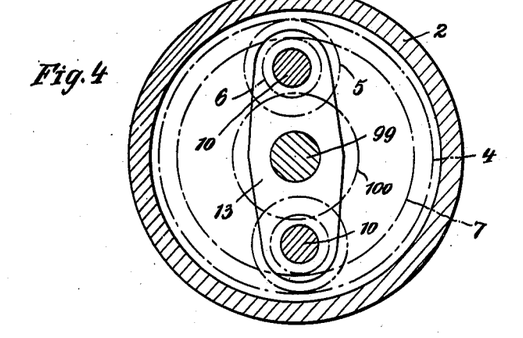

Figures 3 and 4 show a further construction of the gear according to the present invention, by which it is possible to use the engine, for example when travelling down hill, as a brake and at a suitable time to lock some of the parts of the gear in such a manner that a definite transmission ratio is obtained, that is to say a transmission ratio which does not vary automatically with the variation of the load, which is of advantage not only when using the engine as a brake, but also when travelling down steep inclines. In order to obtain this result the form of construction of the gear shown in Figures 1 and 2 is modified.

The smaller wheels 6 of the planet gear, in addition to engaging with the internal teeth 7 of the drum 8 may also engage with a common spur wheel 100 which is keyed to a sleeve 101 rotatably and adjustably mounted on the shaft 9 of the planet gear. This sleeve 101 can be clutched to the smaller drum 8 by means of a slipping clutch capable of being disengaged, for example a laminæ clutch. The small planet wheels 6 are in this case floating, that is to say are arranged outside the two bearing discs 13, keyed to the shaft 9 and between which there are only located the larger planet wheels 5. Each pair of wheels 5 and 6 is keyed to a common shaft 10 rotatably mounted in the two discs 13. These bearing discs, in the form of construction illustrated, are in the shape of an arm as indicated in Figure 4. In order to show the difference relatively to the example of construction shown in Figure 1 the two bearing discs in this case are connected together by a shaft portion 99 arranged concentrically with the shaft 9.

On the sleeve 101 supporting the spur wheel 100 and freely rotatable on the shaft 9 is mounted a disc 103 with a number of laminæ 102ª which co-operate alternately with corresponding laminæ 102ᵇ provided on the internal periphery of the drum 8. To the outermost end of the sleeve 101 is keyed a brake disc 107 by means of which the sleeve 101 and thus also the spur wheel 100 can be braked or completely stopped, this being effected by means of a brake band or the like 104 actuated by a hand lever or pedal.

For this purpose the clutches 17ª, 17ᵇ and 102ª, 102ᵇ must be previously or simultaneously disengaged which may be effected by means of the operating lever 23 which acts on the drum 15 subjected to the pressure of the spring 18. The drum 15, which in this example of construction at the same time serves the purpose of the disc 19 in Figure 1, is movable in grooves of the hub 14 of the drum 18, but is mounted so as to be prevented from rotating relatively to this and after disengaging the clutch 17ª, 17ᵇ, by the brake band or the like 16 it can be braked in such a manner that the direction of rotation of the shaft 9 is reversed in the manner set out in the description of Figures 1 and 2. The tension of the spring 18 is in this case also adjustable by means of the nuts 20 which in this case are fitted on the sleeve 101 and act upon the spring 18 by means of pins 105 which pass through the hub of the brake disc. Also in this example of construction the arrangement is preferably such that the brake bands 16 and 104, according to selection, are positively applied when disengaging the clutches $17^a$, $17^b$, and $102^a$, $102^b$ by means of the operating lever 23.

The gear according to Figures 3 and 4 operates as follows:—

When the clutch $17^a$, $17^b$ is in engagement and does not slip the driving shaft 9 is rigidly clutched to the driven shaft, which corresponds to the highest transmission ratio between the driving and driven shafts, the sleeve 101 also rotates at the same speed together with the wheel 100 keyed thereto as the sleeve 101 is connected to the drum 8 by the clutch $102^a$, $102^b$. In this case no relative movement takes place between the toothed members of the gears. All the parts operate as a rigid connection and the transmission ratio is 1:1.

If it is now desired to use the engine as a brake it is only necessary by moving the operating lever 23 on its pivot 24 in the direction of the arrow against the action of the spring 18 in order to disengage the clutch $17^a$, $17^b$ and thus also the clutch $102^a$, $102^b$ and simultaneously to brake the disc 107 with the sleeve 101 and the wheel 100. The wheels 6 which were hitherto stationary on their shafts 10 rotating in the bearing arms 13 are now caused to roll on the wheel 100 which now lags behind the shaft 9 or is stationary, whereby the wheels 5 are also rotated and accelerate the drum 2. As this is connected to the driving shaft by the disc 3 an acceleration will also be imparted to the engine whereby the pistons thereof will act in the known manner as a brake, this action being increased the greater the braking action applied to the disc 107. The drum 8 is then slightly driven by the rotating wheel 6 and runs idly as the clutches $17^a$, $17^b$ and $102^a$, $102^b$ are disengaged.

As soon as the clutch $17^a$, $17^b$ and thus also the clutch $102^a$, $102^b$ are re-engaged and the brake disc 107 has been released by releasing the band 104 the wheel 100 is connected by the clutch $102^a$, $102^b$ to the drum 8 and this is connected to the drum 2 by the clutch $17^a$, $17^b$ so that all the parts are again in rigid connection as before, that is to say, that the transmission ratio is 1:1, when, as previously stated, the vehicle is being driven at its maximum speed. If for any reason the resistance to travelling is increased the clutch $17^a$, $17^b$ commences to more or less slip and the gear operates in the same manner as the arrangement according to Figures 1 and 2 as the planet wheels 5 and 6 roll in the drums 2, 8 and thus constantly they vary the transmission ratio between the driven shaft and the driving shaft. The spur wheel 100 connected to the drum 8 by the slipping clutch $102^a$, $102^b$ and with the small planet wheels 6 takes up a portion of the transmission of power so that the teeth of the pinions 6 which at the time are in engagement with the internal teeth 7 are substantially relieved of load which is of advantage when the diameter of the wheel 6 or the number of teeth thereof is kept as small as possible for certain reasons. Finally the double engagement of the wheels 6 also increases the static rigidity of the entire connection.

This gear by suitable selection of the transmission ratio may also be so arranged that the engine is connected to the shaft 9 whilst the driven shaft is connected to the disc 3 or to the drum 2. Also with such an arrangement of the gear all the parts operate as a rigid unit as long as the clutch $17^a$, $17^b$ does not slip. As soon, however, as any of the laminæ begin to slip the drums 2 and 9 lag behind the planet wheels 5 and 6 or the bearing discs 13 thereof and relatively to the shaft 9. For the purpose of changing over to backward movement the drum 8 in this case is also braked by means of the disc 15 and the band 16. The spur wheel 100 mounted on the sleeve 101 serves the same purpose in this case. In many cases the arrangement of the gear in this manner has the advantage that a more favourable speed ratio is obtained and thus less wear of the parts.

The most complete construction of a gear particularly suitable for power vehicles according to the invention is illustrated in Figures 5 to 9. This construction not only possesses the advantages of the construction according to Figures 3 and 4 with considerably smaller dimensions and fewer parts, but straining of the slipping clutch and also of the remaining parts of the gear is in this case reduced to a minimum.

In this example of construction it is to be assumed that the shaft 9 supporting the planet gear is connected to the driving shaft whilst the central wheel 2 which gears with the larger planet wheel 5 by means of the internal teeth therein is connected to the shaft 33, which in this case operates as the driven shaft and corresponds with the clutch disc 3 of the previously described example of construction. The drum 2 may be coupled to the shaft 33 by means of a key 40 or in any other suitable manner. In this example of construction only a single planet wheel 5, 6 is provided of which the common shaft 10 connected to the wheels 5 and 6 by a key and groove, is mounted in an eccentric bore 34 of the shaft 9. The shaft 9 is provided with two drum shaped enlargements 90 and 900 each of which is provided with a window-like opening 91 and 901 (see Figures 7 and 8) for the reception of the planet wheels 5 and 6 respectively. The apertures 91 and 901 are limited by an arc described about the centre of the shaft 10 so that the remaining portion of the enlargement 90 or 900 has the shape of a sickle 92 or 902. In the left-hand end surface of the drum 2 are screwed the shafts 35 for two toothed wheels 37, which are loosely mounted on these shafts and gear with the internal teeth 36 of a drum 200 and with a toothed member 100 keyed to the shaft 9, for which purpose the hub of the drum 2 is broken away at two oppositely disposed points as will be clearly seen in Figure 6.

Figure 5:
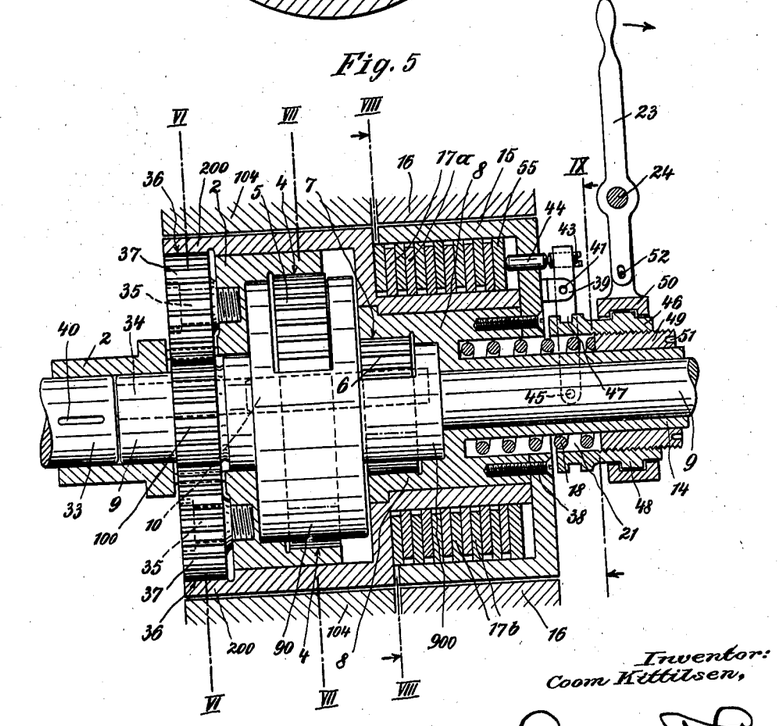
Figure 6:
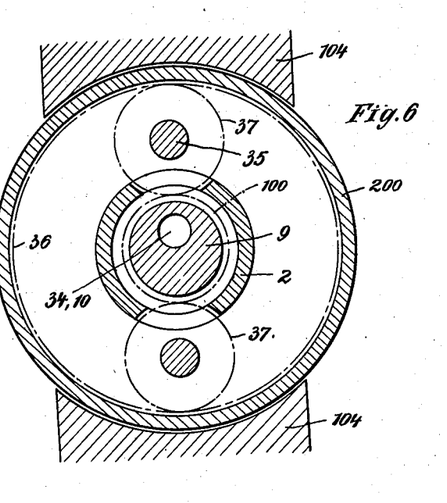
Figure 6 is a section on the line VI—VI of Figure 5.

As long as no relative rolling action takes place between the teeth of the wheels 37 and the toothed member 36 the drum 2, carrying the shafts 35 of the wheels 37, is rigidly connected to the drum 200, capable of being braked by the shoes or the like 104, which is provided with the laminæ 17ª, of the slipping clutch.

Differing from the two examples of construction hereinbefore described the laminæ 17ª in this case are located on the outer side of the drum 200, which is coupled with the larger wheel 5, whilst the laminæ 17ᵇ are mounted on the inner periphery of the drum 15 provided with the smaller number of teeth 7, the end surface thereof being rigidly connected to the drum 8, for example by screws 38.

At the end face of the drum 15 there are provided three bearings 39 (see Figure 9), preferably uniformly distributed around the circumference and receiving shafts 41 on each of which there are pivotally mounted bell crank levers 42. The outer end of these levers is provided with a screw thread into which are screwed set screws or the like 43 bearing against pins 44 which are fitted into bores of the drum wall 15 and bear against a disc 55 which covers the laminæ 17ª or 17ᵇ. The ends of the curved lever parts 42 engage by means of pins 45 or the like in the annular groove 47 of a bush 46 having on its periphery an annular rib 48.

The rib 48 engages with a corresponding annular groove in a ring 50 pivotally connected at 52 to the operating lever 23 and by rocking the latter on its pivot 24 can be moved in an axial direction when it moves the bush 46 rotating therewith. The outer end of the bush 46 is provided with an internal screw thread into which is fitted a lock nut 49 against the rear end surface of which bears a spring 18 which presses against the drum 8 and is located in an annular recess 21 of the drum 8. The front end surface of the nut 49 is provided with slots 51 for the engagement of pins on a spanner for the purpose of enabling the nut to be adjusted relatively to the bush 46 for the purpose of varying the tension of the spring 18. By locking the lever 23 in the direction of the arrow the bush 46 and the nut 49 screwed therein are moved axially against the pressure of the spring 18, whereby the three double levers 44 controlled by the bush are swung about their shafts 41 in a clockwise direction and are raised from the pins 44 as a result of which the laminæ clutch 17ª, 17ᵇ is released.

In so far as the method of operation of this form of construction has not already been set out in the foregoing, it will now be described.

As long as the load on the gear is not so large that the laminæ 17ª and 17ᵇ commence to slip relatively all the parts form a rigid connection, that is to say a transmission ratio of 1:1. As soon however on the increase of load a slipping occurs in the slipping clutch 17ª, 17ᵇ a relative rolling takes place between the large planet wheel 5 and the drum 2, between the small planet wheel 6 and the drum 8, and finally between the teeth 100, 37, 36.

If the clutch 17ª, 17ᵇ has been completely disengaged the drum 2 remains stationary under the load of the vehicle whilst the wheels 37, rotating around their stationary shafts 35 under the action of the toothed member 100, drive the drum 200 which runs idly. The planet wheel 5 mounted on the shaft 10 in the engine shaft 9 rolls on the internal teeth 4 of the stationary drum 2, its speed of rotation being above the speed of the engine. As the wheel 6, rigidly coupled to the larger planet wheel 5 by means of the shaft 10 is in a different relation to the drum 8 than the planet wheel 5 to the drum 2, the drum 8 rotates idly about the engine shaft 9. If however the clutch 17ª, 17ᵇ is slowly engaged the drum 8 is gradually coupled to the driven shaft 33 by means of the parts 200, 37, 2, 40 and a load correspondingly applied thereto so that its speed of rotation is reduced. This causes a lagging of the wheels 5 and 6. As however the engine shaft continues to rotate at a constant speed the large planet wheel 5 is now caused to drive the drum 2 and the driven shaft 33 at a lower speed, but with a higher torque. The spur wheels 37 mounted in the drum 2 in this case rotate around the toothed member 100 of the engine shaft 9, whilst they transmit a portion of the effective torque directly from the shaft 9 or the toothed member 100 to the drum 2 and in this manner partly relieve the load from the planet gear 4, 5, 6, 7. The wheels 37 which rotate about their shafts 35 and simultaneously roll around the toothed member 100 exert through the drum 200, the laminæ 17ª, 17ᵇ, the drum 8 and the teeth 7, 6 a torque which tends to oppose the torque of the engine shaft 9 according to the degree of reduction between the drum 8 and the engine shaft.

As its force however exerts a reaction on the shafts 35 of the wheels 37 and thus also on the drum 2 and the driven shaft 33, practically no energy is lost.

When changing over to reverse movement it is only necessary to release the clutch 17ᵃ, 17ᵇ and at the same time to brake the disc 15 by means of the shoes or the like 16 so that the drum 8 is brought to rest or is braked to a determined period of rotation which is below the speed of idle running. In this manner the drum 2 is caused by the planet gear, in the manner hereinbefore described, to rotate in the opposite direction.

If it is desired to use the engine as a brake then whilst simultaneously releasing the clutch 17ᵃ, 17ᵇ the drum 200 is braked by means of the shoes or the like 104, whereby the planet wheels are entirely relieved of load and a constant transmission ratio is set up by the teeth 100 and 37 between the parts 33, 2 and the engine shaft 9 which is only dependent upon the degree of slipping between the brake shoes 104 and the drum 200 but no longer, as previously, upon the load of the gear. If the drum 200, which in this case at the same time serves the purpose of the disc 107 in Figure 3, is braked until it comes to rest then the speed ratio of the shafts 33 and 9 is now only dependent upon the diameter ratios of the teeth 100 and 36.

If at a given moment with a suitable speed ratio between the shafts 3 and 9 the supply of fuel or the ignition of the engine is interrupted and the drum 200 is braked while simultaneously releasing the clutch 17ᵃ, 17ᵇ then, if it is assumed that the diameters of the teeth 100 and 36 are in the proportion of 1:3, the engine is accelerated correspondingly by the driven shaft, which continues to rotate under the action of the kinetic energy of travelling, whilst the engine acts in the known manner as a brake to a high degree. By gradually tightening the shoes 104 the braking action can be produced substantially more smoothly.

Also in this gear the adjustment of a definite transmission ratio, that is to say a transmission ratio which is independent of the load upon the gear, is of considerable value not only when using the engine as a brake but in many cases during normal travelling, particularly when overcoming considerable gradients as it may become necessary to temporarily overload the engine which would not be possible without definitely fixing a predetermined transmission ratio.

In comparison with the examples of construction hereinbefore described, the gear according to Figures 5 to 9 has the advantage that the speeds of rotation of the toothed wheels are lower, thus reducing wear and noise and increasing the efficiency. Also in this example of construction the slipping between the laminæ 17ᵃ and 17ᵇ is reduced to a minimum. Even an extremely small slipping of the slipping clutch leads to a very considerable variation in the transmission ratio.

Figure 7:
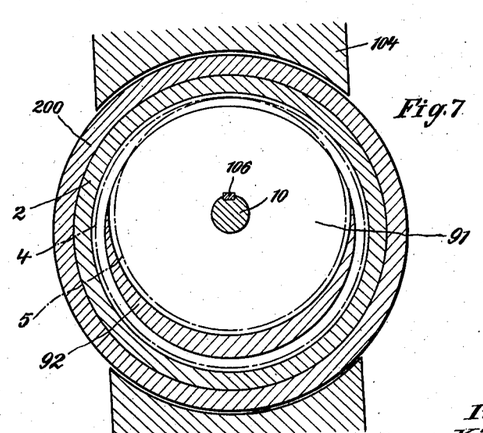
Figure 7 is a section on the line VII—VII of Figure 5, Figure 8, is a section on the line VIII—VIII of Figure 5.
Figure 8:
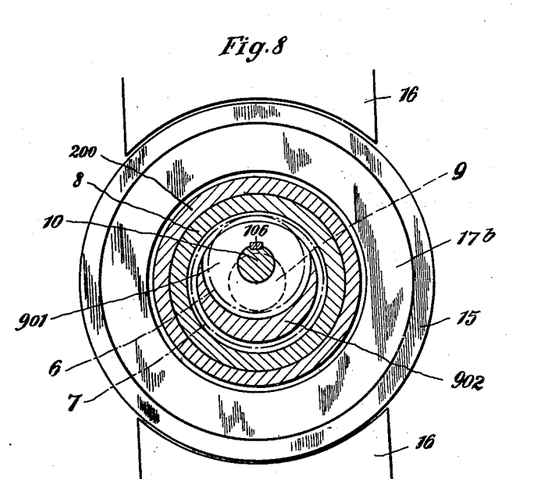
Figure 9:
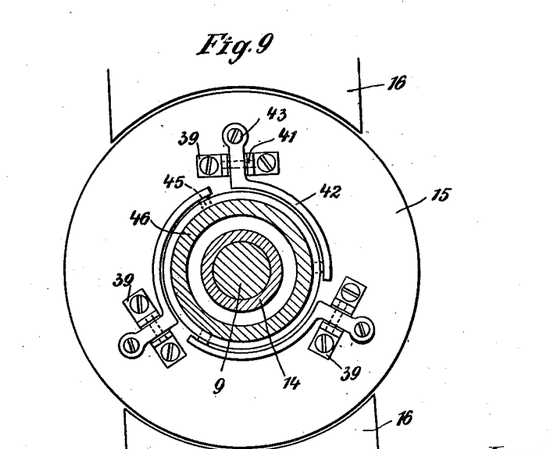
Figure 9 is a section on the line IX—IX of Figure 5.

The assemblage of the gear is effected in the following manner:

First the stepped wheels 5 and 6 are inserted into the openings 91 and 901, whereupon the shaft 10 is introduced through the bore 34 of the shaft 9 and is guided through the bores of the planet wheels 5 and 6. The wheels are then keyed to the shaft 10 by the key 106 (Figures 7 and 8). The drum 10 is then fitted on the shaft 9 whereupon the spur wheels 37 are mounted in position on the shafts 35. The smaller drum 8 is now passed over the planet wheel 6 and the drum 200 is passed over the drum 8 so that the internal teeth 36 thereof engage with the wheels 37. The laminæ 17ᵃ and 17ᵇ are fitted into position alternately and the drum 15 passed over these, this drum being then connected to the drum 8 by means of the screws 38. Finally the spring 18 is placed into the anular groove 21 of the drum 8 whereupon it is only necessary to place in position the double arms 42 with the bush 46 and the locking nut 48.

It may be mentioned that the slipping clutch 17ᵃ, 17ᵇ need not necessarily be located between the two central wheels 2 and 8 or 200 and 8, but may also be located between the engine shaft and the larger central wheel. Such an arrangement of the slipping clutch has the advantage that it only has to transmit the torque derived from the engine, whereas in the examples of construction illustrated and described it has to take up the increased torque due to the transmission.

Figure 10:
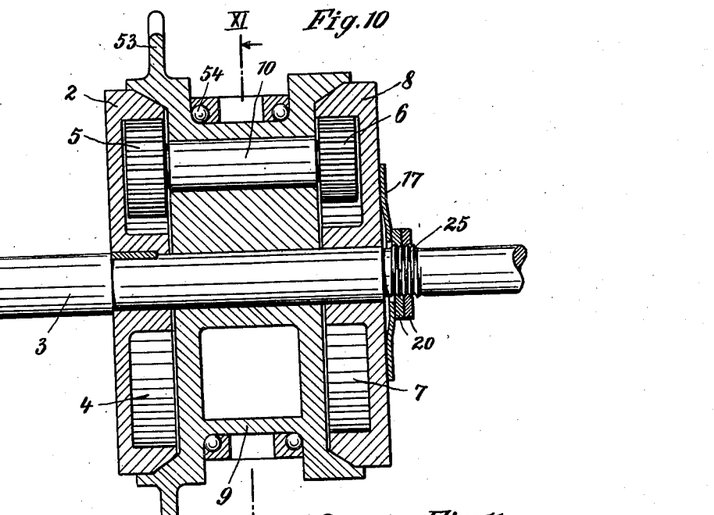
Figure 11:
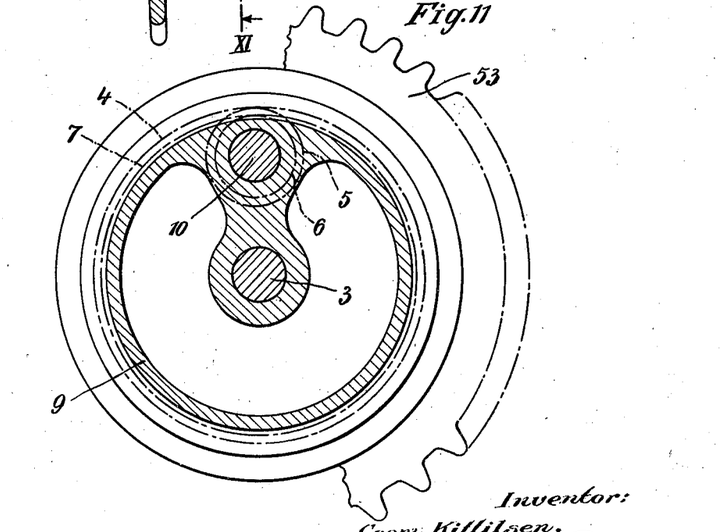

The example of construction for bicycles and the like illustrated in Figures 10 and 11 is naturally of more simple construction. The disengageable slipping clutch is in this case replaced by a spring disc or the like subjected to the action of one or two lock nuts.

On the shaft 3, carrying the pedals (not shown), is keyed the disc 2 with internal teeth 4, serving the purpose of the large central wheel, with which teeth meshes the larger planet wheel 5. The shaft 10 rigidly connected to this wheel 5 is rotatably mounted in the hub member 9 and carries at its other end the smaller wheel 6, which is keyed thereto and meshes with the internal teeth 7 of a second disc 8 against the outer end surface of which bears the spring disc or the like 17. The pressure of the spring disc 17 is adjustable by means of the lock nuts 20 engaging with the screwed portion 25 of the shaft 3. The hub body 9, which is mounted in the known maner in a ball bearing 54, only indicated diagrammatically, carries a chain wheel 53 by means of which the power can be transmitted to the hub of the rear wheel.

The method of operation of the separate parts corresponds with the parts bearing the same references in Figures 1 to 9 previously described. The driving force is transmitted from the shaft 3 to the disc 2 and from this through the planet wheels 5, 6 to the disc 8. As the central wheel 8 is prevented from rotating freely on the shaft 3 by the disc 17 the hub body 9 which receives the planet gear 5, 10, 6 must rotate relatively to the disc 8.

If the resistance to travelling exceeds a predetermined amount the disc 8 will more or less slip on the shaft 3 relatively to the spring disc 17 whereby the speed of the planet gear relatively to the shaft 3 is reduced and the torque acting on the hub 9 or on the chain wheel 53 is correspondingly increased.

It may be mentioned that in all the forms of construction of the invention the transmission ratio between one planet wheel and its corresponding internal teeth must be different to the transmission ratio of the other planet wheel and its corresponding internal teeth.

Although the new gear has been described mainly in connection with vehicles it will be understood that the present invention is not limited to this application. The invention is also applicable with advantage to stationary plants where, for example, it is necessary to adapt the speed of rotation of a shaft under load to the load acting thereon at any time without the driving motor being subjected to load variations at a given speed.

I claim:—

1. In a planet gear for the purpose described, a driving shaft, a driven shaft, a pair of internally toothed drums having different numbers of teeth, one of said drums being secured to one of said shafts, a carrier on the other of said shafts, a pair of pinions of different diameter mounted in said carrier to rotate together and engaging the teeth of said drums, yieldable means for causing the drums and pinions to rotate together as a unit so as to give direct transmission or automatically operable to permit partial relative movement of said drums and gears upon an overload so as to vary the ratio of transmission.

2. In a planet gear as claimed in claim 1, said yieldable means including a clutch and resilient means for normally holding said clutch in engaged position, said resilient means permitting said clutch to slip upon an overload.

3. In planet gear for the purpose described, the combination with a driving member and a driven member, of a pair of internally toothed drums, the number of teeth being different in the two drums, one of said drums being rigidly connected to one of said members, a carrier mounted on the other member, and a pair of planet wheels of different diameter mounted in said carrier to rotate together and gearing with the internal teeth of said drums, toothed wheels rotatably mounted on the drum having larger number of teeth, a gear wheel mounted on the member on which the carrier is mounted and gearing with said toothed wheels, a third drum surrounding the drum having the smaller number of internal teeth, said third drum having internal teeth with which the said toothed wheels engage, and a clutch between the second and third drums.

4. In planet gear for the purpose described, the combination with a driving member and a driven member, of a pair of internally toothed drums, the number of teeth being different in the two drums, one of said drums being rigidly connected to one of said members, a carrier mounted on the other member, and a pair of planet wheels of different diameter mounted in said carrier to rotate together and gearing with the internal teeth of said drums, toothed wheels rotatably mounted on the drum having a larger number of teeth, a gear wheel mounted on the member on which the carrier is mounted and gearing with said toothed wheels, a third drum surrounding the drum having the smaller number of internal teeth, said third drum having internal teeth with which the said toothed wheels engage, and a clutch between the second and third drums, said third mentioned drum including a brake disc, and braking means cooperating with said brake disc.

5. In planet gear for the purpose described, the combination with a driving member and a driven member, of a pair of internally toothed drums, the number of teeth being different in the two drums, one of said drums being rigidly connected to one of said members, a carrier mounted on the other member, and a pair of planet wheels of different diameter mounted in said carrier to rotate together and gearing with the internal teeth of said drums, toothed wheels rotatably mounted on the drum having a larger number of teeth, a gear wheel mounted on the member on which the carrier is mounted and gearing with said toothed wheels, a third drum surrounding the drum having the smaller number of internal teeth, said third drum having internal teeth with which the said toothed wheels engage, and a clutch between the second and third drums, a brake disc on one of said drums, and braking means for cooperating with said brake disc, whereby when a braking action is applied to the brake a reversal of the direction of rotation of the gear is obtained.

6. In a planet gear for the purpose described, the combination with a driving member and a driven member, of a pair of internally toothed drums, the number of teeth being different in the two drums, one of said drums being rigidly connected to one of said members, a carrier mounted on the other member, and a pair of planet wheels of different diameter mounted in said carrier to rotate together and gearing with the internal teeth of said drums, toothed wheels rotatably mounted on the drum having a larger number of teeth, a gear wheel mounted on the member on which the carrier is mounted and gearing with said toothed wheels, a third drum surrounding the drum having the smaller number of internal teeth, said third drum having internal teeth with which the said toothed wheels engage, and a clutch between the second and third drums, and means for braking said second drum.

7. In planet gear for the purpose described, the combination with a driving member and a driven member, of a pair of internally toothed drums, the number of teeth being different in the two drums, one of said drums being rigidly connected to one of said members, a carrier mounted on the other member, and a pair of planet wheels of different diameter mounted in said carrier to rotate together and gearing with the internal teeth of said drums, toothed wheels rotatably mounted on the drum having a larger number of teeth, a gear wheel mounted on the member on which the carrier is mounted and gearing with said toothed wheels, a third drum surrounding the drum having the smaller number of internal teeth, said third drum having internal teeth with which the said toothed wheels engage, and a clutch between the second and third drums, and means for braking two of said drums.

In testimony whereof I affix my signature.

COOM KITTILSEN.